US008446429B2

(12) United States Patent
Wang et al.

(10) Patent No.: US 8,446,429 B2
(45) Date of Patent: May 21, 2013

(54) LAYER STRUCTURE PROVIDING METHOD FOR CONVERTING AND DISPLAYING BACKGROUND SCREEN BASED ON DATA STORAGE INFORMATION AND BACKGROUND SCREEN CONVERTING METHOD THEREFOR, AND MOBILE TERMINAL FOR THE SAME

(75) Inventors: Jee-Yeun Wang, Seoul (KR); Jae-Hwan Kim, Suwon-si (KR); Nho-Kyung Hong, Seoul (KR); Su-Jung Youn, Uijeongbu-si (KR)

(73) Assignee: Samsung Electronics Co., Ltd (KR)

(*) Notice: Subject to any disclaimer, the term of this patent is extended or adjusted under 35 U.S.C. 154(b) by 874 days.

(21) Appl. No.: 11/542,341

(22) Filed: Oct. 3, 2006

(65) Prior Publication Data

US 2007/0132746 A1 Jun. 14, 2007

(30) Foreign Application Priority Data

Dec. 9, 2005 (KR) .................. 10-2005-0120684

(51) Int. Cl.
*G09G 5/00* (2006.01)
(52) U.S. Cl.
USPC ........................................ 345/629; 715/967
(58) Field of Classification Search
USPC .................. 715/967; 345/589–618, 629
See application file for complete search history.

(56) References Cited

U.S. PATENT DOCUMENTS

| 6,549,219 | B2 * | 4/2003 | Selker ........................ 715/834 |
| 2002/0036642 | A1 | 3/2002 | Kwon et al. |
| 2002/0054117 | A1 * | 5/2002 | van Dantzich et al. ....... 345/766 |
| 2003/0020762 | A1 * | 1/2003 | Budrys et al. ................. 345/835 |
| 2004/0027351 | A1 | 2/2004 | Kim et al. |
| 2004/0080518 | A1 | 4/2004 | Lee |
| 2005/0085272 | A1 * | 4/2005 | Anderson et al. ............. 455/566 |
| 2005/0190196 | A1 | 9/2005 | O'Neil et al. |

FOREIGN PATENT DOCUMENTS

| GB | 2 373 977 A | 10/2002 |
| GB | 2373977 A * | 10/2002 |

OTHER PUBLICATIONS

Konfabulator Widget by Justin Pulsipher, screen shot taken of website archived through the Internet Archive Wayback Machine, accessed Aug. 5, 2009 of webpage archived on Jun. 2, 2005.*

* cited by examiner

*Primary Examiner* — Xiao M. Wu
*Assistant Examiner* — Scott E Sonners
(74) *Attorney, Agent, or Firm* — The Farrell Law Firm, P.C.

(57) ABSTRACT

Disclosed herein are a layer structure providing method for converting and displaying a background screen based on data storage information and a background screen converting method therefor, and a mobile terminal for the same. The providing method includes providing and configuring a background layer to match to one region on an application-by-application basis within the mobile terminal, and displaying and providing the data storage information on the application-by-application basis, as background, to the region; and providing and matching a visual item layer to each region provided from the background layer, and displaying and providing a value based on the data storage information of the region matching to each application.

12 Claims, 11 Drawing Sheets

← LESS — UPDATED DATA — MORE →

FIG.6B

← EMPTY — MEMORY STATE — FULL →

FIG.6C

← LESS — NUMBER OF EDITIONS — MORE →

LAYER STRUCTURE PROVIDING METHOD FOR CONVERTING AND DISPLAYING BACKGROUND SCREEN BASED ON DATA STORAGE INFORMATION AND BACKGROUND SCREEN CONVERTING METHOD THEREFOR, AND MOBILE TERMINAL FOR THE SAME

PRIORITY

This application claims priority under 35 U.S.C. §119 to an application entitled "Layer Structure Providing Method For Converting and Displaying Background Screen Based on Data Storage Information and Background Screen Converting Method therefor, and Mobile Terminal For The Same" filed in the Korean Intellectual Property Office on Dec. 9, 2005 and assigned Serial No. 2005-120684, the contents of which are incorporated herein by reference.

BACKGROUND OF THE INVENTION

1. Field of the Invention

The present invention relates generally to a method for converting a background screen and a mobile terminal for the same, and more particularly, to a layer structure providing a method for converting and displaying a background screen based on data storage information and a background screen converting method therefor, and a mobile terminal for the same.

2. Description of the Related Art

In recent years, as mobile terminals becomes a universally utilized and a necessity of life, many people often change several functions such as a background screen or bell sound of the mobile terminal depending on fashion trends or their own tastes. For example, usually, a screen setting function is usefully utilized as a method for decorating a user's mobile terminal, making it distinctive from terminals of other persons. Further, the new generation expresses humor by decorating the screen using his/her taken picture or downloaded image suitable to his/her peculiar personality.

It is a trend in which, while additional functions satisfying various user requests are gradually enlarged, the mobile terminal screen size is gradually increased and the number of colors is sequentially increased. Furthermore, as user requests diversify and become in detail incompatable with prior reqests, it is necessary to more efficiently use and variously utilize screen space in the mobile terminal. Accordingly, in order to enhance effective value of the screen and satisfy various user desires in the mobile terminal, efficient utilization for integrating various services with additional functions in the mobile terminal is needed. In the utilization, user's convenience should be prioritized.

Furthermore, in recent years, development tendency of a user interface of the mobile terminal is focused on expression of information for satisfying user personality rather than on accurate transmission of the information. Accordingly, in transmitting the information, it is required to enhance visibility for the information transmission and provide a funny and new interface to the user through various expression of the information.

As described above, in order to enhance the effective value of the screen and satisfy the various user desires in the mobile terminal, the present invention provides a method for enhancing visibility of information transmission based on various user personalities, at the same time.

SUMMARY OF THE INVENTION

It is, therefore, an object of the present invention to provide a layer structure providing method for converting and displaying a background screen based on data storage information and a background screen converting method therefor, and a mobile terminal for the same, for enhancing visibility for the data storage information of the mobile terminal and providing a delightful and new interface to a user.

To achieve the above and other objects, there is provided a method for providing a layer structure for displaying a background screen based on data storage information in a mobile terminal. The method includes providing and configuring a background layer to match to one region on an application-by-application basis within the mobile terminal, and displaying and providing the data storage information on the application-by-application basis, as background, to the region; and providing and matching a visual item layer to each region provided from the background layer, and displaying and providing a value based on the data storage information of the region matching to each application.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

The present invention embodies a function of bringing a graphic element into relief depending on data storage information of a mobile terminal, and expressing the storage information. For this, the present invention checks the data storage information of each application, considers the storage information in a visual theme set by a user, and outputs the visual theme based on the storage information to a background theme. As described above, the mobile terminal enables the user to previously set a desired visual theme and outputs the background screen to the set visual theme based on the data storage information. Therefore, there is an effect of adding an entertainment element to a user interface of the mobile terminal.

Figure 1:
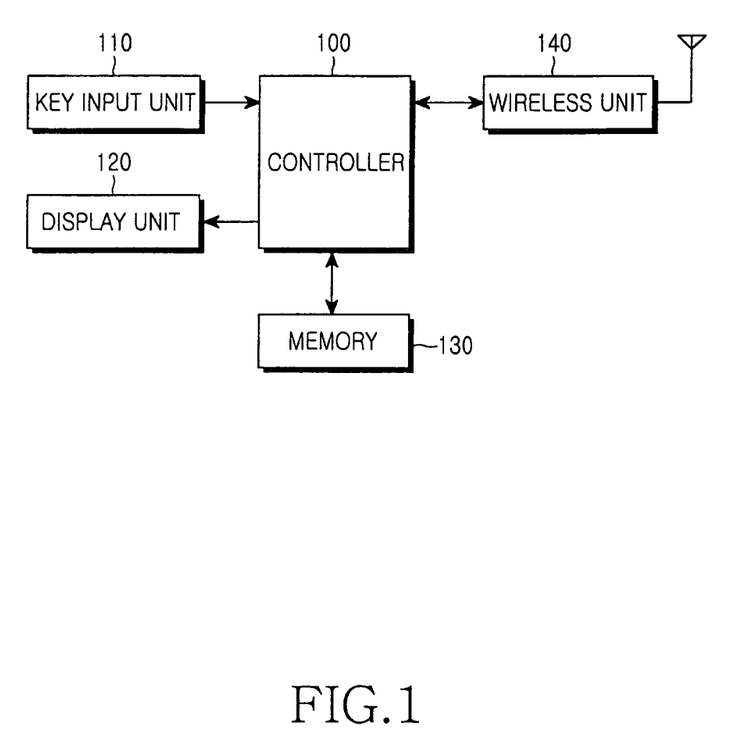
FIG. 1 illustrates a construction of a mobile terminal according to the present invention.

A constituent element and an operation of the mobile terminal having the above function will be described with reference to FIG. 1. FIG. 1 illustrates a construction of the mobile terminal according to the present invention.

Referring to FIG. 1, the inventive mobile terminal includes a controller 100, a key input unit 110, a display unit 120, a memory 130, and a wireless unit 140.

The controller 100 performs a general control operation of the mobile terminal. In particular, the controller 100 controls and considers the data storage information in the visual theme set by the user, and outputs the background screen providing a visual effect based on the visual theme, through the display unit 120. At this time, the background screen based on the data storage information is outputted with a different visual effect based on the preset visual theme.

In detail, the controller 100 checks a state of data provided at each application of the mobile terminal. In other words, the controller 100 checks the amount of data stored in each application, the amount of updated data, and a memory state. The data of each application is all data that can be stored, added, edited, and deleted depending on execution of a function of the application. The inventive application refers to an application capable of storing data varied depending on user's input and network environment, and having quantifiable data. The mobile terminal has a plurality of applications having the above function. In an exemplary embodiment of the present invention, the application, such as a phonebook, a camera capture, an inbox message, and a call log, is exemplified and described among the plurality of applications.

The controller 100 checks the state of data of each application, that is, the storage information, and checks the preset visual theme. At this time, the visual theme can be set by the user. The visual theme is to provide the visual effect to the background screen depending on the storage information of application data, and can selectively apply a visual condition, such as a visual item, color, brightness, and contrast, for visual expression.

After checking the preset visual theme, the controller 100 considers the storage information of each application data in the visual theme and then outputs the background screen having the visual effect based on the visual theme. A process of considering the storage information of each application data in the visual theme will be described in detail below.

The key input unit 110, i.e. a device for interface with the user, includes a variety of keys including various function keys, numeric keys (0 to 9), and special function keys (*, #). The key input unit 110 provides key input data inputted by the user to the controller 100. In other words, the key input unit 110 outputs its own key input data depending on each key press, applies the outputted key input data to the controller 100, and detects whether the key input data depends on any key press. As a result, the controller 100 performs certain operations.

Under control of the controller 100, the display unit 120 receives and displays display data for the key input data inputted from the key input unit 110, or displays an operation state and a plurality of information of the mobile terminal using an icon and a character. Under the control of the controller 100, the display unit 120 allows the user to, when the user sets or enables a necessary function, visually acknowledge a state thereof. The display unit 120 displays the visual theme having the visual effect depending on the storage information of each application data.

The memory 130 includes a Read Only Memory (ROM) and a Random Access Memory (RAM) for storing a plurality of programs and data. In an exemplary embodiment of the present invention, the memory 130 stores not only data on a display item on a layer-by-layer basis depending on the visual theme, and data generated depending on each application operation, but also the number of the stored data, updating time of the data, and log data of each event transmitted and received in the mobile terminal. The memory 130 stores a predetermined visual theme, and stores the visual theme set by the user as a basic visual theme. In order to set the visual theme, the user can select his/her desired visual condition constituting the visual theme, and set the basic visual theme.

In particular, the memory 130 has a table showing interaction between the storage information of each application data and the visual condition constituting the visual theme, for example, the number of visual items, the color, the brightness, and the contrast. The table consists of information obtained by mapping numeric values of the number of the stored data, the updating time of the data, an amount of a used memory, and the number of editions with numeric values of the respective visual item, color, brightness, and contrast. For example, where a total memory capacity is assumed to be "100", the numeric value of the amount of the used memory can be mapped to the numeric value of the brightness that has a numeric of 0 to 100 depending on the amount of the used memory. Where the amount of the used memory is mapped to the brightness value is exemplified, the amount of the used memory can also be mapped to the contrast value or predetermined color.

Accordingly, on the basis of the table stored in the memory 130, the controller 100 can vary the background screen through combination of the data storage information and the visual condition constituting the visual theme, using the state of the stored data of the mobile terminal. In other words, depending on the storage information of each application data, it is possible to vary the visual item, the color.

The wireless unit 140 is connected with the controller 100. The wireless unit 140 converts voice data and control data into a radio signal and transmits the converted data, and receives a radio signal and converts the received radio signal into voice data and control data.

The layer structure of the background screen for outputting the visual effect that varies depending on the data storage information in the mobile terminal, as described below, making reference to FIG. 2, which illustrates the layer structure of the background screen in the mobile terminal according to the present invention.

Figure 2:
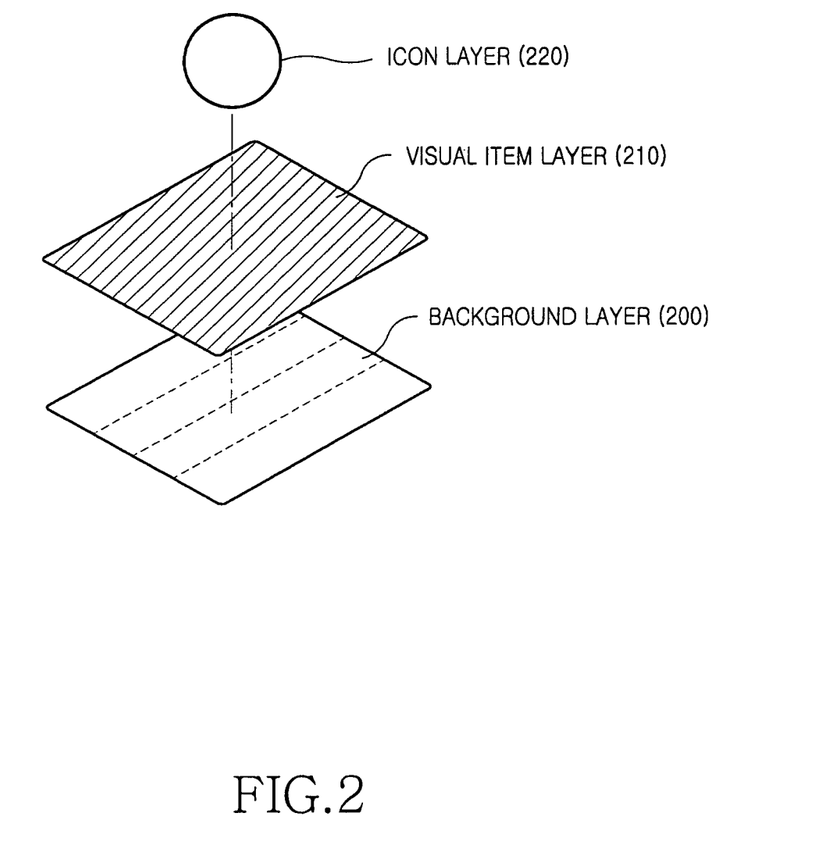
FIG. 2 illustrates a layer structure of a background screen in a mobile terminal according to the present invention.

As shown in FIG. 2, the background screen of the mobile terminal includes a background layer 200 for providing background considering the data storage information; a visual item layer 210 for displaying the visual item depending on the number, i.e. amount, of each stored application data; and an icon layer 220 for displaying a symbol or a picture, and informing a current operation state based on key press. In other words, the icon layer 220 displays icons of various shapes, such as a telephone icon for showing a call state, a speaker icon for showing a sound setting item, and a battery icon for showing a battery state. The icon shown in the icon layer 220 is outlined and processed to enhance visibility. The visual item of the visual item layer 210 has, in principle, the background of the visual theme provided from the background layer 200 and the visual item overlapped and provided so that they can be visually distinguished.

The background layer 200 and the visual item layer 210 used to provide the background screen according to the present invention will be described in detail below.

First, the background layer 200 displays the background based on the visual theme through a terminal screen. The background layer 200 displays the basic visual theme. The background layer 200 displays the background based on the storage information of each application data considered in the visual condition selected by the user. The background layer 200 is configured to have each region matched on an application-by-application basis within the mobile terminal, and displays the storage information of each application data, as the background, in the matched region. In other words, the background layer 200 can have the region matched and distinguished on the application-by-application basis.

In order to inform the region of a storage state of the application data and give visual delightfulness, the background layer 200 displays the visual theme configured using the predefined visual condition in each region.

Figure 3A:
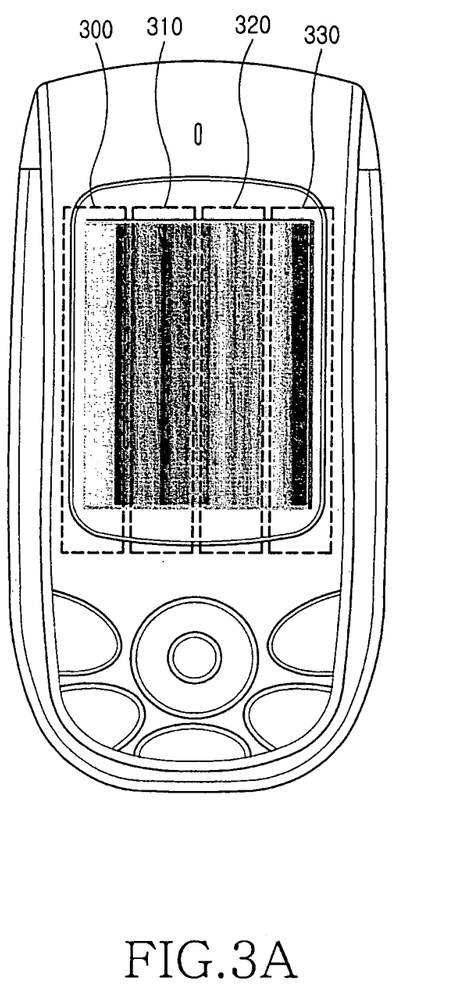
FIG. 3A is an example of a region of a screen divided at a constant interval according to the present invention.
Figure 3B:
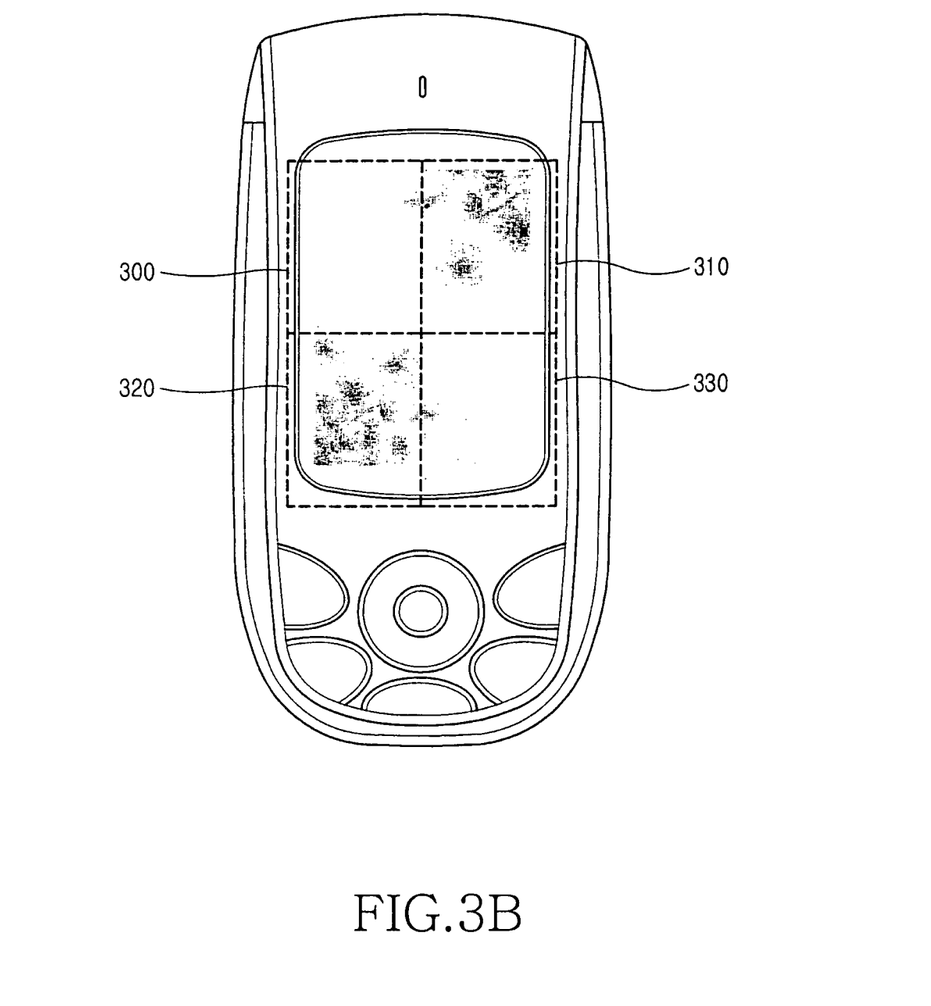
FIG. 3B is an example of a region of a screen divided in a tile type according to the present invention.

In the present invention, as shown in FIGS. 3A and 3B, the region on the application-by-application basis is exemplarily distinguished, as just one example of the present invention. In other words, the background layer 200 can have at least one region, and the region on the background screen can be provided in various types and can be varied depending on user selection.

Making reference to FIG. 3A illustrating the region of the screen divided at a constant interval where the four applications to be displayed on the background screen are denoted by reference numerals 300, 310, 320, and 330, it is exemplified that the state of the application data is shown on the four distinguished regions. For a detailed description of an exemplary embodiment of the present invention, it is assumed that each region denoted by the reference numerals 300, 310, 320, and 330 is an application region of such as a phonebook, a camera capture, an inbox message, and a call log.

FIG. 3A shows each application region configured by the visual theme, not by a simple text format, depending on each data element of the application. The visual theme is provided through combination of the visual condition such as the visual item, the color, the brightness, and the contrast. To configure the visual theme, there are of course various applicable methods for visually showing the state of data, such as a shape, in addition to the visual condition. Where the color, the brightness and the contrast are all set at one time, the visibility for the data storage information can be reduced. Therefore, it is desirable to selectively combine the visual condition for enhancing the user visibility.

As shown in FIG. 3B, a phonebook application region 300, a camera capture application region 310, an inbox message application region 320, and a call log application region 330 of FIG. 3A can be also shown in a quadri-sectioned format of a tile type. FIG. 3B illustrates that the visual item based on the amount of data is displayed on each region divided in the tile type.

The visual item layer 210 is provided to match with each region of the background layer 200. The visual item layer 210 displays the visual item for informing the amount of the stored application data of the region. In other words, the visual item layer 210 matches with each region of the background layer 200 to display and provide a value based on the application data storage information of the region matched to each application, in the visual item type. The visual item layer 210 can provide various shapes, for example, an object, a stripe, a figure, and a flower, to each region, and display the state of the application data matched to each region.

For example, in FIG. 3B, as the number of messages increases in the inbox message region 310, the number of flowers that is the visual item is increased and displayed in the inbox message region 310. In the above description, the flower is exemplified and described as the visual item, but the amount of data can be also shown using a number of stripes. In other words, the visual item showing the number of data can be provided in various types. In the present invention, the visual item is an expression method for sentimentally showing how much data is included in the application region.

According to the present invention, FIG. 3A shows the background screen that considers the data storage information depending on each region in the visual theme configured by the visual condition such as the color, the brightness, and the contrast provided from the background layer 200. In the present invention, the color of the visual condition has an interaction, as the data of each region is updated and stored, the color becomes more red, and as the data gets more out of date, the color becomes more blue. The brightness has an interaction in which, as the amount of the used memory gets closer to a full state, it becomes darker. The contrast has an interaction in which, as the user updates the data by re-storage, deletion, and editing, it becomes clearer.

According to the present invention, the background screen displayed on the background layer 200 will be described in detail with reference to FIG. 4. FIG. 4 is an example of the background screen that is varied depending on variation of the data storage information according to the present invention. In the following, a description will be made based on the assumption that FIG. 4 has the same divided region of FIG. 3A.

Figure 4A:
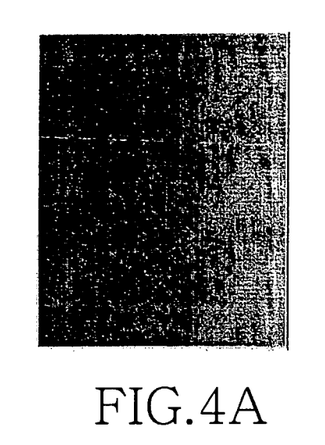
FIG. 4 is an example of a background screen that is varied depending on variation of data storage information according to the present invention.

Making reference to FIG. 4A, which shows that the brightness is dark at a side of the phonebook application region and shows as relatively bright in other regions. Through this, the user can appreciate that much data is stored, in particular, at a side of the phonebook application region, and the memory almost reaches the full state. In FIG. 4A, it is exemplified that, since there is relatively little updated data, the inbox message application region and the camera capture application region is blue in color.

Figure 4B:
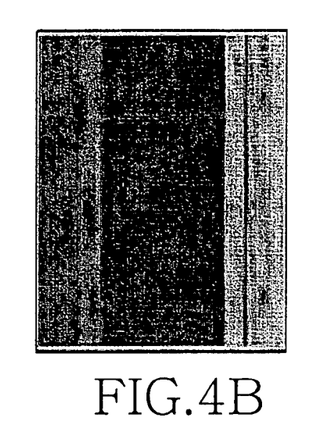

FIG. 4B exemplifies a case where the brightness is dark and the relative contrast shows colors that are close to gray color, rather than pure color. In FIG. 4B, the user can appreciate that much data is stored in the inbox message application region and the camera capture application region, and that the memory has almost reached the full state, and can appreciate that the updated data of each region has not been recently edited.

Figure 4C:
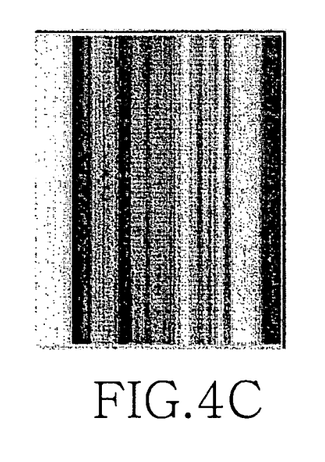

In FIG. 4C, the color generally shows red-based color in each application region and, in particular, the color is a strong red color in the inbox message application region. Accordingly, in FIG. 4C, the user can appreciate that much data is stored in most application regions and, in particular, updated communication data are much provided in an updated inbox message application region.

Figure 5:
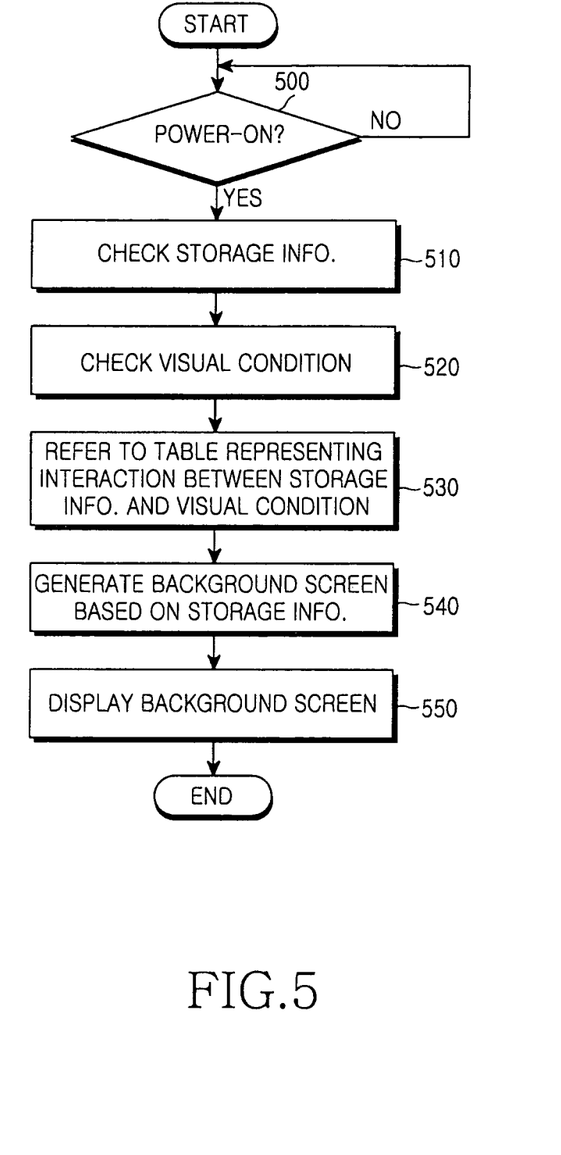
FIG. 5 is a flowchart illustrating a process of displaying a visual theme depending on data storage information using a layer structure of a background screen of a mobile terminal according to the present invention.

A flowchart illustrating a process of displaying the visual theme based on the data storage information through the layer structure of the background screen of the mobile terminal according to the present invention will be described with reference to FIG. 5.

The controller 100 determines whether the terminal is in a powered-on state in Step 500. If it is determined as the determination result to be the power-on state, the storage information of each application data is checked in Step 510. In detail, the controller 100 checks the storage information, such as the amount of the application data matched to each region of the background screen, the amount of the used memory, the edition state, and updating or non-updating. After that, in Step 520, the controller 100 checks the visual condition set by the user, to configure the visual theme. The visual condition includes at least one theme selected by the user of the visual item, the color, the brightness, and the contrast. In Step 530, the controller 100 refers to the table showing the interaction between the storage information and the checked visual condition (as shown in FIG. 6), and, in Step 540, generates the background screen based on the storage information. The background screen is displayed in Step 550.

A process of displaying the background screen will be described in detail below. In the following description, the visual item, the color, and the brightness are selected by the user from the visual condition, and are set as the basic visual condition.

In the layer structure provided as in FIG. 2, the background layer 200 outputs the visual theme based on the data storage information to every application region. In the visual theme, the storage information of the data mapped to a preset visual condition is visually expressed. That is, a check is made of how much updated data exists and the amount of the used memory, and the color and the brightness mapped to the updated data and the amount of the used memory are decided depending on the checked result, and the decided color and brightness are outputted through the background layer 200.

If the amount of application data is checked, the visual item predefined on the region matched to each application provided by the background layer 200 is outputted through the visual item layer 210. In other words, the visual items are overlapped and outputted, corresponding to the number of the data of the region, in each region to which the color and the brightness are outputted.

The visual data can vary by considering the data storage information at a predetermined period. For example, as described above, the visual theme varying when power turns on is displayed as the background screen, but the visual theme based on the data storage information can be updated and displayed as the background screen once per day.

Below, an example of the present invention will be described with reference to FIG. 6, which illustrates the interaction between the data storage information and the visual condition according to the present invention.

Figure 6A:
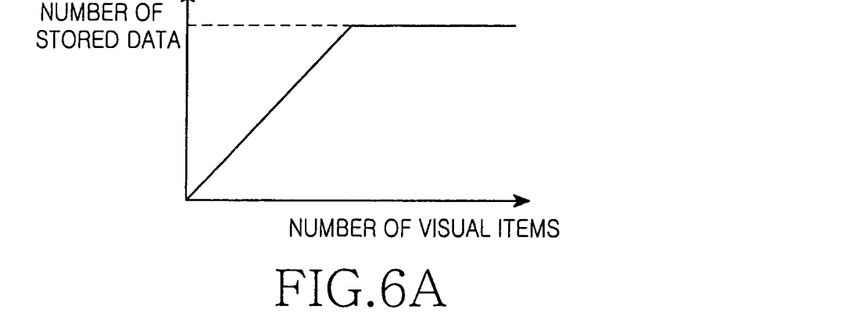
FIGS. 6A-D illustrate interaction between data storage information and visual condition according to the present invention.

FIG. 6A illustrates interaction between the number of the visual items and the amount of stored data. It can be appreciated that, as the amount of stored data increases, the number of the visual items also increases. If the amount of stored data reaches a maximum number, the number of the visual items is no longer increased. For example, as the number of stored messages, the number of phonebooks, the number of camera capture image, and statistic data recorded per call get more, the number of the visual items outputted through the visual item layer 210 is increased.

Figure 6B:
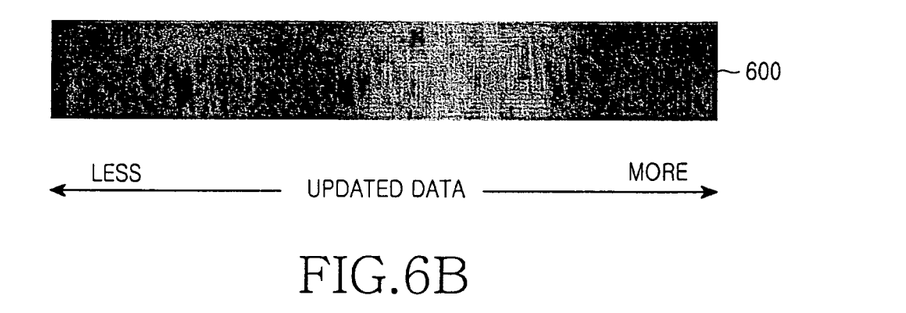

FIG. 6B illustrates interaction between the color of the visual condition and the updated data. As the updated data of each application increases, the color becomes closer to a red color, and, as the updated data decreases, the color becomes closer to a blue color. For example, the color on spectrum is decided depending on more or less of the message updates and messages received at a message box, the updated data stored in the phonebook, the updated data stored in a camera image folder, and the updated data recorded on the call log.

Figure 6C:
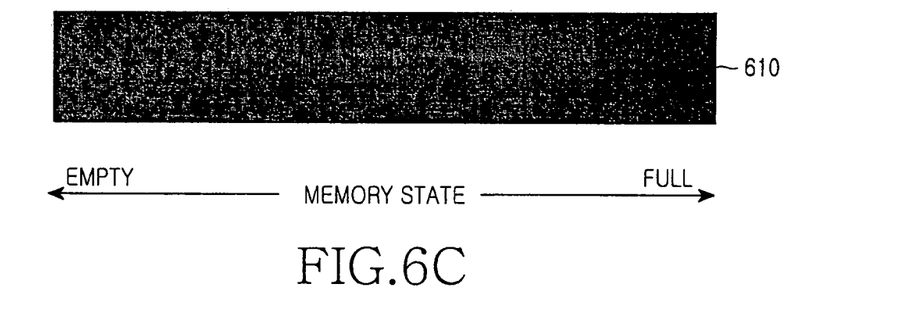
Figure 6D:
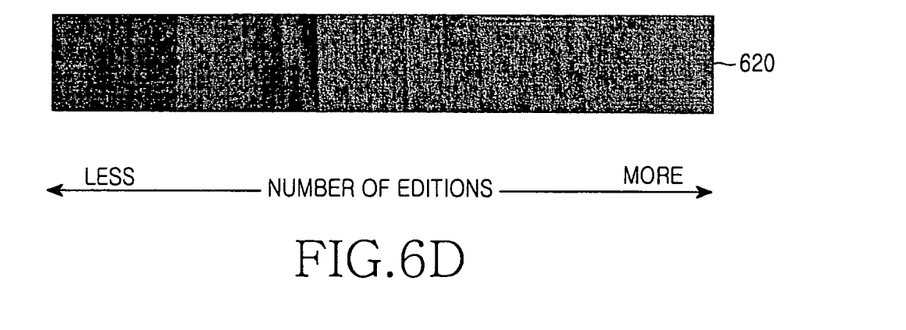

FIG. 6C illustrates interaction between the contrast of the visual condition and the number of editions. As the number of editions, i.e. edits increases, the contrast is unclear and the color becomes closer to a gray color, and, as the number of editions decreases, the contrast is clear and the color becomes closer to a pure color. For example, where the user intention-ally edits and deletes or stores data in the message box, where he/she edits or additionally stores a telephone number in the phonebook, where he/she deletes a camera image list or changes a name, and where he/she deletes the statistic data based on the call log or records new statistic data, it is regarded as an edit.

Figure 7A:
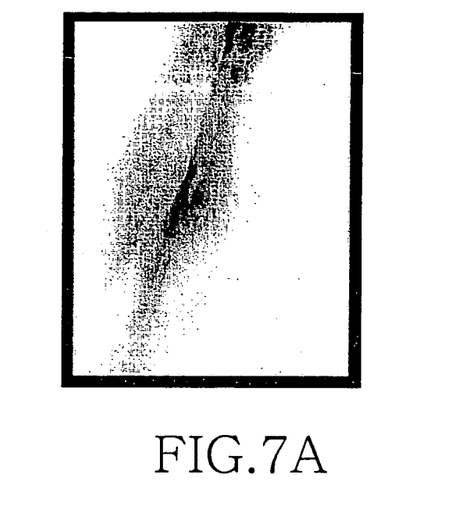
FIGS. 7A and 7B are a first example of a background screen according to the present invention.
Figure 7B:
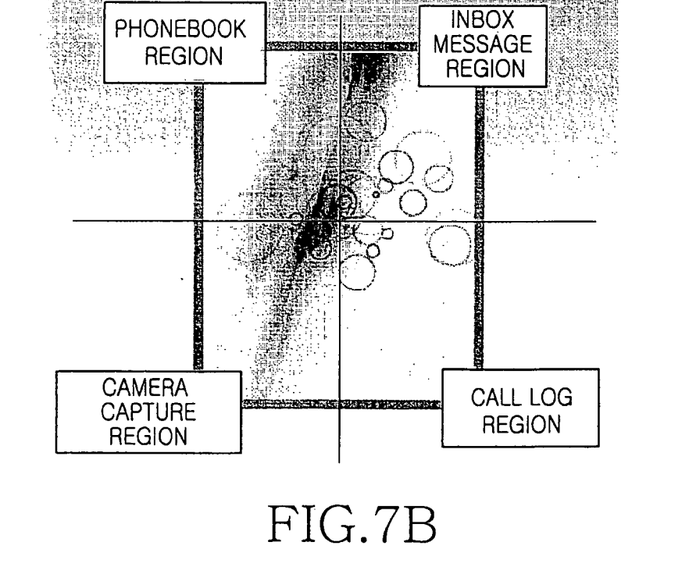
Figure 8:
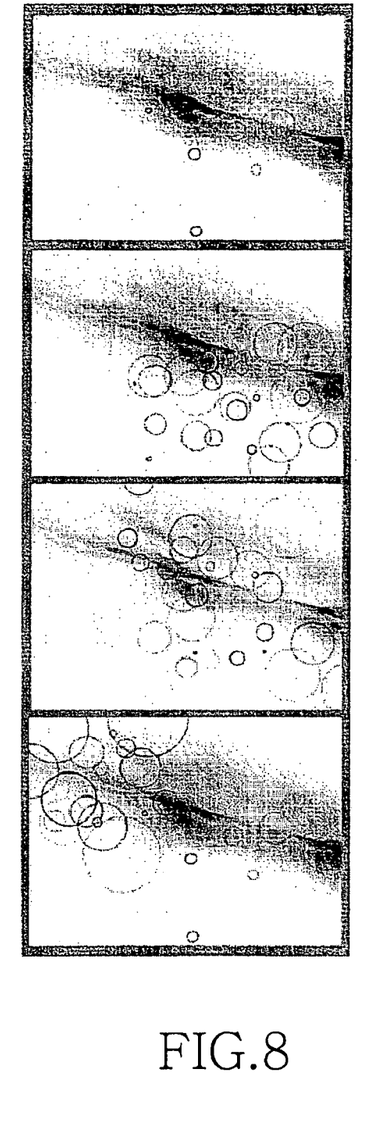
FIG. 8 is various examples when the background screen of FIGS. 7A and 7B is varied.

In reference to FIGS. 7 and 8, according to the present invention, the background screen of FIG. 7A can be comprised of the region each matched to one region on the application-by-application basis, as shown in FIG. 7B.

FIG. 8 exemplifies the background screen showing geometrical interaction between the data storage information of each region and the visual condition of the region configured as shown in FIG. 7B, and showing a circular-type wavelength shape additionally provided as the visual item in the visual item layer 210 in a state where an image of FIG. 7A is displayed in the background layer 200. In FIG. 8, a variation effect is shown in which, as an amount of data increases, many more wavelength shapes are displayed and provided, and the color showing the amount of the used memory can also vary.

Figure 9A:
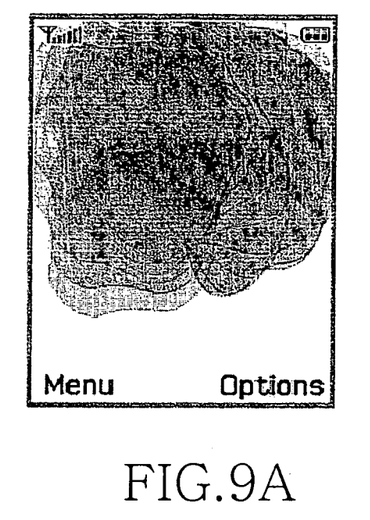
FIGS. 9A and 9B are a second example of a background screen according to the present invention.
Figure 9B:
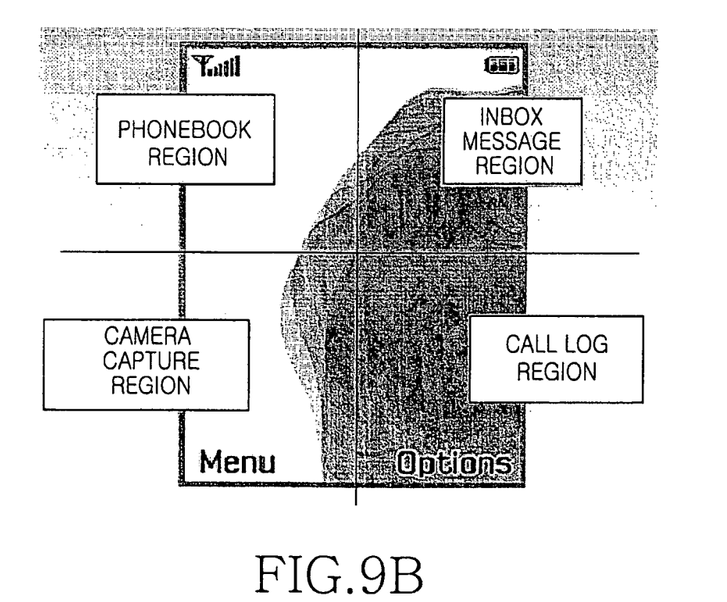
Figure 10:
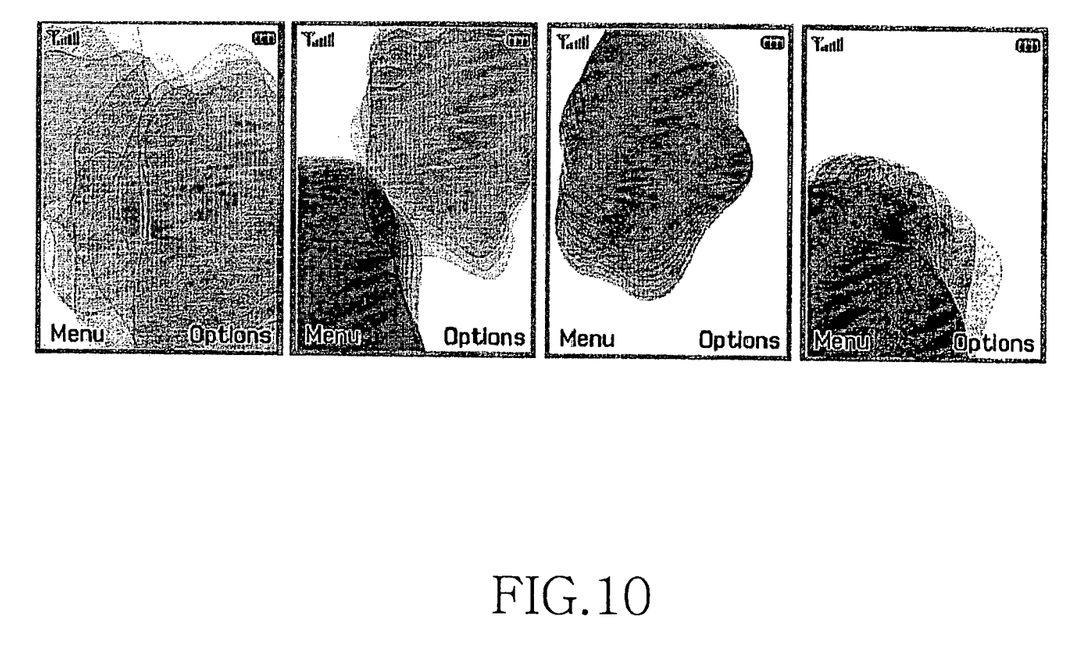
FIG. 10 is various examples when the background screen of FIGS. 9A and 9B is varied.

In the above, the wavelength shape is exemplified and described as the visual item, but a technique in which the color is varied with feeling of rubbed pastel, without limitation to specific shape, as shown in FIGS. 9A to 10 is also applicable. In other words, expression content of the data storage information can be provided in various types.

The above exemplifies various techniques in which a constant function is provided while the data storage information is visually shown depending on data generated under a network environment including user's data input and output.

As described above, in the present invention, it is possible to display the visual theme updated depending on the interaction between the quantifiable data and the visual condition of the mobile terminal, such as how much data each application stores, whether data is updated at anytime, and whether the amount of the used memory of the application approaches the maximum. By doing so, information intended to be transmitted from the mobile terminal to the user can be shown as a sentimental visual image.

According to the present invention, it is possible that the background screen of the mobile terminal is organically varied depending on the information of the mobile terminal. By this, there is an effect in which user data input/output and the interaction based on the network environment can be viewed on the background screen, and entertainment element can be added to the user interface.

Further, in the present invention, when the information is expressed, sentimental approach can be implemented by configuring the visual theme using the visual condition, such as the visual item, the color, the brightness, and the contrast, not using the text format, depending on the storage information of each application data.

Furthermore, in the present invention, there is an effect in that, since the user can freely set and modify the construction of the background screen, various user individualities can be considered and at the same time, the visibility for information transmission can be enhanced.

While the invention has been shown and described with reference to certain preferred embodiments thereof, it will be understood by those skilled in the art that various changes in form and details may be made therein without departing from the spirit and scope of the invention, as defined by the appended claims.

What is claimed is:

1. A method for providing a layer structure for displaying a background image representing data storage information in a mobile terminal, the method comprising the steps of:
configuring a background layer, which is positioned in an undermost position of all layers displayed on a screen of the mobile terminal, to provide a plurality of rectangular tiled regions, wherein the plurality of rectangular tiled regions correspond respectively to a plurality of applications within the mobile terminal;
displaying storage information about data stored by each of the plurality of applications in each of the corresponding plurality of regions, as the background image; and
matching a visual item layer to each of the plurality of rectangular tiled regions provided from the background layer,
wherein the storage information about the stored data is a visual representation corresponding to a numerical value of an amount of memory space occupied by the data stored by each of the plurality of applications,
wherein the plurality of applications includes at least two of a phonebook application, a camera capture application, and a call log application,
wherein the visual representation is determined based on a table representing information obtained by mapping numeric values of an updating time of each application data, the amount of memory space occupied by the application data, and a number of editions to the application data, to numeric values of color, brightness and contrast, and
wherein the editions of the application data include at least two of a case where a telephone number in a phonebook is edited or additionally stored, a case where an image captured by a camera is deleted or a name of the image is changed, and a case where previous statistic data on a call log is deleted or new statistic data is recorded on the call log.

2. The method of claim 1, further comprising providing an icon layer, and displaying a current operation state of the mobile terminal on the background image provided from the background layer.

3. The method of claim 1, wherein a visual item provided from the visual item layer is overlapped and provided to visually distinguish from the background image provided from the background layer.

4. The method of claim 1, wherein the background layer enables a user to selectively set the figure, the color, the brightness and the contrast, for visual expression of the background based on the storage information about the data stored by each of the plurality of applications.

5. A method for converting a background image of a background layer based on storage information of data in a mobile terminal, the method comprising the steps of:
checking storage information about data stored by an application, on an application-by-application basis, for a plurality of applications within the mobile terminal;
checking a visual condition for displaying the storage information for each of the plurality of applications;
checking an interaction between the storage information for each of the plurality of applications and the visual condition; and
displaying the storage information in a plurality of rectangular tiled regions of the background layer configured to match respectively to each of the plurality of applications, using the interaction,
wherein the storage information about the stored data is a visual representation corresponding to a numerical value of an amount of memory space occupied by the data stored by each of the plurality of applications,
wherein the plurality of applications includes at least two of a phonebook application, a camera capture application, and a call log application,
wherein the visual representation is determined based on a table representing information obtained by mapping numeric values of an updating time of each application data, the amount of memory space occupied by the application data, and a number of editions of the application data, to numeric values of color, brightness and contrast, and
wherein the editions of the application data include at least two of a case where a telephone number in a phonebook is edited or additionally stored, a case where an image captured by a camera is deleted or a name of the image is changed, and a case where previous statistic data on a call log is deleted or new statistic data is recorded on the call log.

6. The method of claim 5, further comprising displaying the storage information about the data stored by each of the plurality of applications in each of the plurality of rectangular tiled regions matching to each of the plurality of applications, in a visual item type.

7. The method of claim 6, wherein the visual item is overlapped and displayed on the background image.

8. The method of claim 5, wherein the background image is updated and displayed at a predetermined period depending on variation of the storage information.

9. The method of claim 5, further comprising a user selectively setting the figure, the color, the brightness, and the contrast, for visual expression of the background image based on the storage information about the data stored by each of the plurality of applications.

10. A mobile terminal for converting a background image of a background layer based on data storage information, the terminal comprising:
a memory for storing a visual condition for respectively displaying storage information about data stored by each of a plurality of applications within the terminal in a plurality of rectangular tiled regions corresponding to the plurality of applications within the mobile terminal, as a background image, storing the visual condition selected by a user as a basic visual condition, and storing a table representing an interaction between the visual condition and the storage information;
a controller for controlling and outputting the background image based on the storage information considered in the basic visual condition with reference to the table stored in the memory; and
a display unit for displaying the background based on the storage information in the plurality of rectangular tiled regions of the background layer, which is positioned in an undermost position of all layers displayed on a screen of the mobile terminal, corresponding respectively to the plurality of applications, under control of the controller,
wherein the storage information about the stored data is a visual representation corresponding to a numerical value of an amount of memory space occupied by the data stored by each of the plurality of applications,
wherein the plurality of applications includes at least two of a phonebook application, a camera capture application, and a call log application,
wherein the memory stores a table representing information obtained by mapping numeric values of an updating time of each application data, the amount of memory space occupied by the application data, and a number of editions of the application data, to numeric values of color, brightness, and contrast, and wherein the editions of the application data include at least two of a case where a telephone number in a phonebook is edited or additionally stored, a case where an image captured by a camera is deleted or a name of the image is changed, and a case where previous statistic data on a call log is deleted or new statistic data is recorded on the call log.

11. The mobile terminal of claim 10, wherein the controller controls and outputs a value based on the storage information in each of the plurality of regions matching to each of the plurality of applications, in a visual item type.

12. The mobile terminal of claim 11, wherein the display unit overlaps and displays the visual item type on the background image displayed in each of the plurality of rectangular tiled regions on an application-by-application basis within the mobile terminal, under control of the controller.

* * * * *